United States Patent
Choi

(10) Patent No.: US 7,912,514 B2
(45) Date of Patent: Mar. 22, 2011

(54) ELECTRICAL POWER GENERATOR, MOBILE TERMINAL PROVIDED WITH THE SAME AND CONTROL METHOD THEREOF

(75) Inventor: In-Sup Choi, Incheon (KR)

(73) Assignee: LG Electronics Inc., Seoul (KR)

(*) Notice: Subject to any disclaimer, the term of this patent is extended or adjusted under 35 U.S.C. 154(b) by 356 days.

(21) Appl. No.: 11/519,091

(22) Filed: Sep. 12, 2006

(65) Prior Publication Data

US 2007/0059957 A1    Mar. 15, 2007

(30) Foreign Application Priority Data

Sep. 13, 2005   (KR) .................. 10-2005-0085346

(51) Int. Cl.
*H04B 1/38* (2006.01)
(52) U.S. Cl. ............... 455/573; 455/343.1; 320/101
(58) Field of Classification Search .......... 455/573; 320/101
See application file for complete search history.

(56) References Cited

U.S. PATENT DOCUMENTS

| 5,856,728 | A * | 1/1999 | Zimnicki et al. ......... 315/209 PZ |
| 6,636,146 | B1 * | 10/2003 | Wehoski ..................... 340/10.4 |
| 6,882,128 | B1 * | 4/2005 | Rahmel et al. ............... 320/101 |
| 2004/0198256 | A1 * | 10/2004 | Filipovic ..................... 455/102 |
| 2004/0200613 | A1 * | 10/2004 | Fripp et al. ............... 166/250.01 |

FOREIGN PATENT DOCUMENTS

| CN | 1214136 A | 4/1999 |
| FR | 2 756 953 A1 | 6/1998 |
| JP | 1-126178 A | 5/1989 |
| KR | 20-0215134 | 3/2001 |
| KR | 20-0221396 | 4/2001 |
| KR | 10-2004-0107110 | * 12/2004 |

* cited by examiner

*Primary Examiner* — Kent Chang
*Assistant Examiner* — German Viana Di Prisco
(74) *Attorney, Agent, or Firm* — Birch, Stewart, Kolasch & Birch, LLP

(57) ABSTRACT

An electrical power generator that generates power based on a carrier frequency of a received signal, a mobile terminal provided with the same and a control method thereof are discussed. The mobile terminal according to an embodiment includes an electrical power generator to generate an electrical energy based on a carrier frequency separated from a signal received from a base station.

14 Claims, 2 Drawing Sheets

ELECTRICAL POWER GENERATOR, MOBILE TERMINAL PROVIDED WITH THE SAME AND CONTROL METHOD THEREOF

This application claims priority to Korea Patent Application No. 10-2005-0085346 filed on Sep. 13, 2005 in Republic of Korea, the entire contents of which are hereby incorporated by reference in its entirety.

BACKGROUND OF THE INVENTION

1. Field of the Invention

The present invention relates to a mobile terminal, and more particularly, to an electrical power generator that can generate power based on a carrier frequency, a mobile terminal provided with the same and a control method thereof.

2. Description of the Related Art

In recent years, as the functions of mobile terminals have become more complicated and diverse, and as their performance has improved, the power consumption for the mobile terminals has increased. Therefore, power management using software and/or hardware has become more important when designing a mobile terminal in order to reduce power consumption thereof.

Especially, when a user makes a voice call, power consumption of the mobile terminal is high. In the related art, when a user makes a voice call using his mobile terminal, a voice data signal in a carrier frequency is received from a base station, the carrier frequency carrying the voice data signal is removed, and the voice data signal is extracted and processed to allow the user to receive a voice call.

However, the mobile terminal according to the related art uses power supplied from a battery attached thereto, and thus has a restricted overall usage time because the mobile terminal battery capacity is limited.

SUMMARY OF THE INVENTION

Therefore, an object of the present invention is to provide an electrical power generator, which can increase the usage time of a battery by using a carrier frequency (used in carrying an information/data signal from a base station) to generate electrical energy and can supply additional power to a mobile terminal by using the generated electrical energy along with the battery of the mobile terminal. A mobile terminal provided with such power generator and a control method thereof are also provided.

Another object of the present invention is to provide an electrical power generator, which can increase the usage time of a battery by using a carrier frequency (used in carrying an information/data signal from a base station) and charging the battery with the converted electrical energy, and to provide a mobile terminal provided with the same and a control method thereof.

Yet another object of the present invention is to provide an electrical power generator, which can increase the usage time of a battery by converting a carrier frequency carrying an information/data signal intended to be delivered by a base station and can supply power to additional equipment of the mobile terminal by using the converted electrical energy, and to provide a mobile terminal provided with the same and a control method thereof.

Still another object of the present invention is to provide an electrical power generator, which can use a converted electrical energy as a signal (bias for communication) for recognizing a digital signal within a mobile terminal by converting a carrier frequency carrying an information/data signal intended to be delivered by a base station, and to provide a mobile terminal provided with the same and a control method thereof.

Still another object of the present invention is to provide an electrical power generator, a mobile terminal having the power generator, and a control method of the mobile terminal, which address the limitations and disadvantages associated with the related art.

To accomplish the above objects, there is provided an electrical power generator according to an embodiment of the present invention, comprising: a receiving unit to receive from an information provider a synthesis signal synthesized using an information/data signal intended to be delivered by the information provider and a carrier frequency; a separation unit to separate the carrier frequency from the received synthesis signal; and an electrical energy generation unit to generate an electrical energy based on the separated carrier frequency.

According to an aspect of the present invention, there is provided a mobile terminal provided with an electrical power generator, comprising: an electrical power generator to generate an electrical energy based on a carrier frequency separated from a signal received from a base station.

According to another aspect of the present invention, there is provided a control method of a mobile terminal provided with an electrical power generator, comprising receiving from a base station a synthesis signal synthesized using an information/data signal intended to be delivered by the base station and a carrier frequency; separating the carrier frequency from the received synthesis signal; and generating an electrical energy based on the separated carrier frequency.

According to another aspect of the present invention, there is provided a mobile communication device comprising: a transceiver to send and receive communication signals with a communications network over a wireless interface; a processor to extract a frequency of a carrier signal received from the communications network; and a power generator having a substance that resonates according to the extracted frequency to create mechanical vibrations that are converted into electrical energy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, a description will be made with reference to FIGS. 1 to 5 with respect to some exemplary embodiments of a mobile or portable terminal (e.g., mobile phone, PDA, smart phone, handset, wireless communication device, etc.) with a power supply (e.g., battery) according to the present invention, which can increase the usage time of the power supply such as the battery, and can charge the battery and supply required power to additional equipment of the mobile terminal by using a carrier frequency carrying an information/data (information or data) signal intended to be delivered by a base station so as to generate electrical energy and supply the generated electrical energy to the mobile terminal.

The configuration and operation method of a mobile terminal according to the present invention to be explained hereinafter will be described only with respect to the parts required to understand the present invention, and it should be noted that a description of the other parts may be omitted such that the gist of the present invention may not be obscured.

Figure 1:
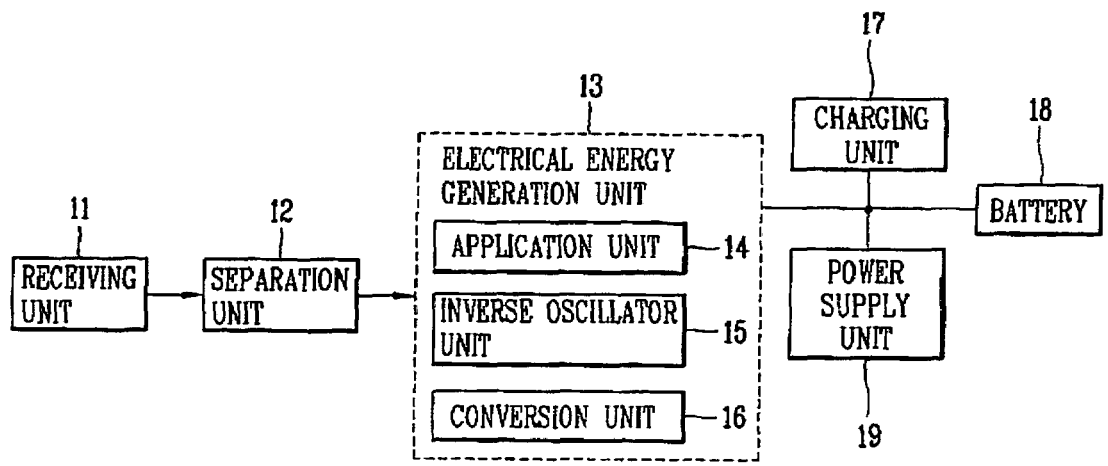
FIG. 1 is a block diagram showing the configuration of an example of an electrical power generator of a mobile terminal according to an embodiment of the present invention.

FIG. 1 is a block diagram showing the configuration of an example of an electrical power generator of a mobile terminal (or other suitable device) according to the present invention.

As illustrated in FIG. 1, the electrical power generator of the mobile terminal according to the present invention may include a receiving unit 11 for receiving from a base station (or communication network via wireless interface) a synthesis (or modulated) signal composed of (1) an information/data signal intended to be delivered by the base station and (2) a carrier frequency carrying the information/data signal synthesized with each other; a separation unit 12 for separating the carrier frequency (carrier signal) from the received synthesis signal; and an electrical energy generation unit 13 for generating an electrical energy based on the separated carrier frequency. All the components of the mobile terminal including the electrical power generator are operatively coupled. Although not shown, the mobile terminal also includes components commonly known for the device.

Here, the electrical energy generation unit 13 may include an inverse oscillator unit 15 including a material having inherent frequency characteristics such that the separated carrier frequency causes the material to vibrate; an application unit 14 for applying the separated carrier frequency signal to the inverse oscillator unit 15 to cause the material to resonate; and a conversion unit 16 for converting a kinetic energy of the material within the inverse oscillator unit 15 causing resonance by the applied carrier frequency into an electrical energy.

According to an embodiment, the material (e.g., crystal) within the inverse oscillator unit 15 has high frequency characteristics that match with the frequency of the carrier signal. As such, if the carrier frequency that is separated from the signal received from the base station is applied to the material under control of the application unit 14, the material resonates at the same or approximately the same frequency as that of the received carrier signal. The resonating material results in mechanical vibrations that can be converted into electrical energy via the conversion unit 16. This may be achieved by an electro-mechanical scheme whereby a metallic coil is mounted to move or reciprocate due to the resonating or vibrating material of the inverse oscillator unit 15. As the coil repeatedly moves within a magnetic field provided by a permanent magnet, a voltage is thereby induced on the coil due to the variation of magnetic flux between the moving coil and the permanent magnet. This generated voltage may be used together with additional power amplifying and processing means to provide electrical energy for low power operations of the mobile terminal and/or to at least partially recharge the battery of the mobile terminal. As the electrical energy generation unit 13 may be relatively small in size due to its implementation within the mobile terminal, the generated power may also be relatively small, but still can be used in the mobile terminal.

The mobile terminal provided with the electrical power generator according to the present invention can generate power as it is provided with the electrical power generator as set forth. Still referring to FIG. 1, the mobile terminal provided with the electrical power generator according to the present invention may further include a charging unit 17 for charging a battery 18 of the mobile terminal using the electrical power generated by the electrical power generator of FIG. 1 and a power supply unit 19 for supplying electrical power including the electrical power generated by the generator of FIG. 1 to the mobile terminal and its additional equipment.

Furthermore, the use of the above-described electrical power generator is not limited to mobile terminals but is applicable to a variety of equipment. Thus it can produce and supply electrical power by using an inverse oscillator that includes a material having the same resonance frequency as a carrier frequency used for carrying an information/data signal outputted from a base station or other source.

Hereinafter, the operation of a device (e.g., mobile terminal) provided with the electrical power generator as set forth according to the present invention will be described in detail with reference to FIG. 2. This operation can be implemented using the electrical power generator of FIG. 1.

Figure 2:
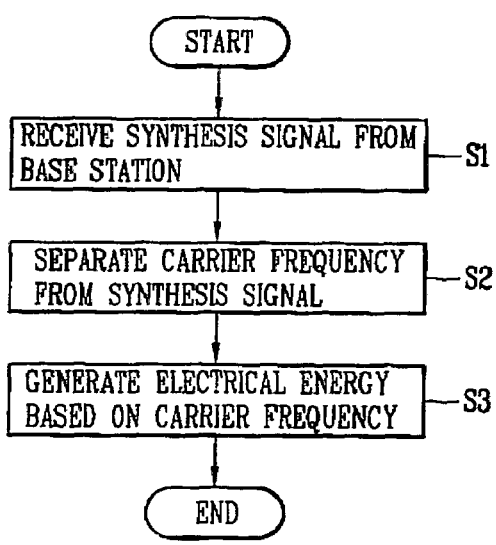
FIG. 2 is a flow chart showing the operation of a mobile terminal or other device provided with the electrical power generator according to an embodiment of the present invention.

FIG. 2 is a flow chart showing the operation of a mobile terminal provided with the electrical power generator according to an embodiment of the present invention.

As illustrated in FIG. 2, a control method of the mobile terminal provided with the electrical power generator according to the present invention may include receiving from a base station (or any applicable source) a synthesis (or modulated) signal composed of an information/data signal intended to be delivered by the base station and a carrier frequency carrying the information/data signal synthesized with each other (S1); separating the carrier frequency from the received synthesis signal (S2); and generating an electrical energy using the separated carrier frequency (S3).

The control method of the operation of the mobile terminal provided with the electrical power generator according to an embodiment of the present invention will be described below.

First, a base station does not send an information/data signal intended to be delivered directly through the air interface, but sends a synthesis (or modulated) signal of the information/data signal and a carrier frequency carrying the information/data signal synthesized with each other. Here, the information/data signal may be varied. For instance, the information/data signal may include a voice data signal, a current time notification signal, a current position registration signal, etc. The carrier frequency may be from 750 to 850 MHz in case of a cellular phone, and from 1.8 to 1.9 GHz in case of a PCS phone. Other carrier frequencies can be used.

Figure 3:
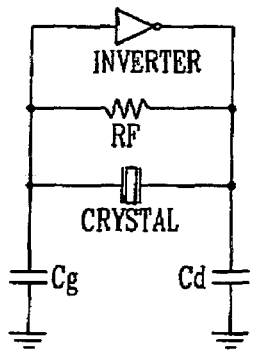
FIG. 3 shows an example of a circuit of an oscillator for generating a frequency upon receipt of electrical energy according to an embodiment of the present invention.

At the base station or other suitable device, the carrier frequency can be generated as an electrical energy is inputted into an oscillator as shown in FIG. 3. As illustrated in FIG. 3, the oscillator includes a crystal unit, an inverter element, a capacitor (Cg, Cd, etc.) and so on. The procedure of the oscillator generating a carrier frequency upon receipt of an electrical energy is well known to those skilled in the art, and thus its discussion will be omitted. Other techniques can be used to generate the carrier frequency at the base station. The base station then can generate a synthesis signal by modulating an information/data signal using the carrier frequency, and transmit the synthesis signal to the mobile terminal.

Figure 4:
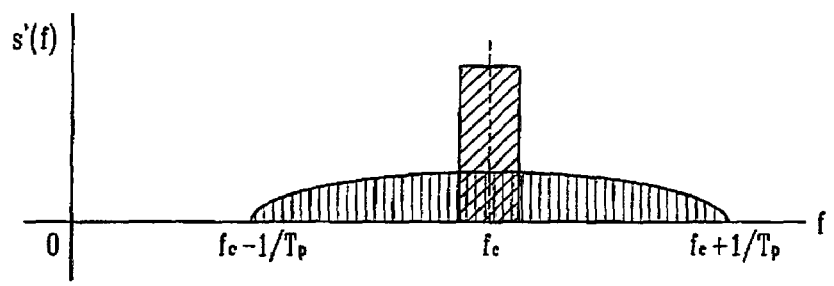
FIG. 4 shows an example of a synthesis signal of an information/data signal and a carrier frequency synthesized within a base station according to an embodiment of the present invention.

As an example only, the synthesis signal composed of the information/data signal and the carrier frequency synthesized with each other at, e.g., a base station is shown in FIG. 4.

As illustrated in FIG. 4, the synthesis signal appears in a given frequency interval $((fc+1)T_p \sim (fc-1)T_p)$ around the carrier frequency (fc). Here, $T_p$ is a modulation coefficient, i.e., a period of a signal sent from the base station to the atmosphere.

The receiving unit 11 (FIG. 1) receives from the base station this synthesis signal. In case of a mobile terminal, it is preferable that an antenna serves as the receiving unit 11.

Figure 5:
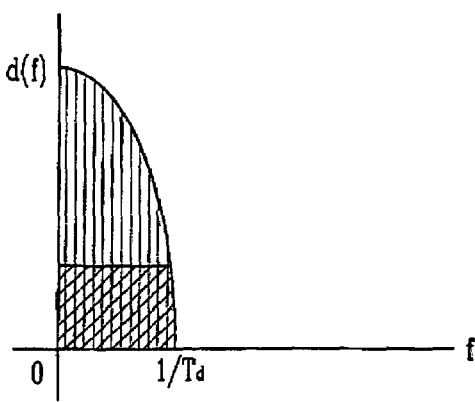
FIG. 5 shows an example of an information/data signal which is obtained by removing a carrier frequency from a synthesis signal within a mobile terminal according to an embodiment of the present invention.

The separation unit 12 separates the carrier frequency from the received synthesis signal. That is, the separation unit 12 decodes the synthesis signal. The synthesis signal from which the carrier frequency is removed or separated by decoding is as shown in FIG. 5. FIG. 5 shows an example of an information/data signal which is obtained by removing a carrier frequency from a synthesis signal within a mobile terminal.

As illustrated in FIG. 5, the information/data signal obtained by removing the carrier frequency from the synthesis signal is concentrated at an interval of $1/T_d$ with a frequency of 0. Here, $T_d$ is a period used in a baseband processing unit of the mobile terminal. That is to say, when the synthesis signal sent from the base station is decoded through the separation unit 12, as much frequency as fc (which is a carrier frequency) is removed. Namely, the present invention utilizes as much frequency as fc in generating an electrical energy.

Meanwhile, the information/data signal separated from the synthesis signal is transmitted to the baseband processing unit of the mobile terminal for processing.

The electrical energy generation unit 13 receives the separated carrier frequency (fc) and generates an electrical energy based on the separated carrier frequency (fc). Typically, in case of voice call, the mobile terminal consumes a large quantity of electrical power. Thus, it is preferable that when receiving a voice call data signal, the electrical energy generation unit 13 generates an electrical energy by converting the carrier frequency carrying the voice data signal. The operation of the electrical energy generation unit 13 will be explained in more detail.

As discussed above, the electrical energy generation unit 13 may include the inverse oscillator unit 15 including a material portion having an inherent frequency such as the separated carrier frequency and causing resonance by the separated carrier frequency; the application unit 14 for applying the separated carrier frequency to the inverse oscillator unit 15; and the conversion unit 16 for converting a kinetic energy of the material portion causing resonance by the applied carrier frequency into an electrical energy.

The inverse oscillator unit 15 includes the material portion having the same inherent frequency as the carrier frequency used by the base station. Thus, when the carrier frequency is applied to the material portion of the inverse oscillator unit 15 through the application unit 14, the material portion of the inverse oscillator unit 15 resonates and accordingly, the material portion moves (oscillates) to thus generate a kinetic energy. Here, the efficiency of the kinetic energy generated by the carrier frequency is dependent on a material of the material portion. In one aspect, the lower the carrier frequency, the higher the efficiency of generation of kinetic energy may be.

The conversion unit 16 converts the generated kinetic energy into an electrical energy so that the mobile terminal (or other device) can easily use it. A variety of methods of converting a kinetic energy into an electrical energy can be employed. For example, the conversion unit 16 is able to convert a kinetic energy into an electrical energy through the principle of a power generator using the Fleming's law.

The charging unit 17 can charge the battery 18 of the mobile terminal based on the generated electrical energy. The power supply unit 19 supplies electrical power to be consumed by the mobile terminal and its additional equipment. That is, the power supply unit 19 can supply the power from the battery of the mobile terminal and in addition, it can supply the electrical power generated by the electrical power generator of the present invention to the mobile terminal and the additional equipment of the mobile terminal.

Further, in the case that the electrical energy generated by the electrical power generator of the present invention is weak, the generated electrical energy can be used as a signal (bias for communication) for recognizing a digital signal within the mobile terminal or for other purpose.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

As described above in detail, the mobile terminal provided with the electrical power generator according to the present invention can increase the usage time of a battery by converting a carrier frequency carrying an information/data signal intended to be delivered by a base station into an electrical energy and supplying for power consumed by the mobile terminal by using the converted electrical energy in parallel with (or in supplement of) the battery of the mobile terminal.

Moreover, the mobile terminal provided with the electrical power generator according to the present invention can increase the usage time of a battery by converting a carrier frequency carrying an information/data signal intended to be delivered by a base station and charging the battery with the converted electrical energy.

Moreover, the mobile terminal provided with the electrical power generator according to the present invention can increase the usage time of a battery by converting a carrier frequency carrying an information/data signal intended to be delivered by a base station and supplying power to additional equipment of the mobile terminal by using the converted electrical energy.

Moreover, the mobile terminal provided with the electrical power generator according to the present invention can use a converted electrical energy as a signal (bias for communication) for recognizing a digital signal within the mobile terminal by converting a carrier frequency carrying an information/data signal from a base station.

The electrical power generator according to the present invention is applicable to and used in various fields without being limited mobile terminals to exhibit the above effects.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An electrical power generator included in a mobile terminal, the electrical power generator comprising:
    a receiving unit to receive a synthesized signal from an information provider, said synthesized signal including an information/data signal synthesized with a carrier frequency;
    a separation unit to separate the carrier frequency from the received synthesized signal; and
    an electrical energy generation unit to determine if the information/data signal is a voice call signal for the mobile terminal, and to selectively generate an electrical energy when the voice call data signal is received, using only the separated carrier frequency by converting the separated carrier frequency into the electrical energy if the information/data signal is the voice call signal for the mobile terminal,
    wherein the electrical energy generation unit comprises:
    an inverse oscillator unit including a material having an inherent frequency and resonating by the separated carrier frequency;
    an application unit to apply the separated carrier frequency to the inverse oscillator unit; and
    a conversion unit to convert kinetic energy of the resonating material into the electrical energy.

2. The electrical power generator of claim 1, wherein the information provider is a base station in a mobile communication system.

3. A mobile terminal, comprising:
    a transceiver to send and receive communication signals with a communications network over a wireless interface; and
    an electrical power generator including a receiving unit to receive a synthesized signal from an information provider, said synthesized signal including an information/data signal synthesized with a carrier frequency, a separation unit to separate the carrier frequency from the received synthesized signal, and an electrical energy generation unit to determine if the information/data signal is a voice call signal for the mobile terminal, and to selectively generate an electrical energy when the voice call data signal is received using only the carrier frequency separated from the received synthesized signal by converting the separated carrier frequency into the electrical energy if the information/data signal is the voice call signal for the mobile terminal,
    wherein the electrical energy generation unit comprises:
    an inverse oscillator unit including a material having an inherent frequency and resonating by the separated carrier frequency;
    an application unit to apply the separated carrier frequency to the inverse oscillator unit; and
    a conversion unit to convert kinetic energy of the resonating material into the electrical energy.

4. The mobile terminal of claim 3, wherein the receiving unit is a single antenna.

5. The mobile terminal of claim 3, wherein the carrier frequency is in the range of 750 MHz to 850 MHz.

6. The mobile terminal of claim 3, wherein the carrier frequency is in the range of 1.8 GHz to 1.9 GHz.

7. The mobile terminal of claim 3, further comprising a charging unit to charge a battery of the mobile terminal based on the generated electrical energy.

8. The mobile terminal of claim 3, further comprising a power supply unit to supply the generated electrical energy directly to components of the mobile terminal consuming power.

9. A method of controlling a mobile terminal, the method comprising:
    receiving from a base station a synthesized signal including an information/data signal synthesized with a carrier frequency;
    separating the carrier frequency from the received synthesized signal;
    determining if the information/data signal is a voice call signal for the mobile terminal; and
    selectively generating an electrical energy when the voice call data signal is received using only the separated carrier frequency by converting the separated carrier frequency into the electrical energy if the information/data signal is the voice call signal for the mobile terminal.

10. The method of claim 9, further comprising charging a battery of the mobile terminal based on the generated electrical energy.

11. The method of claim 9, further comprising supplementing power consumed by the mobile terminal and its additional equipment with the generated electrical energy.

12. The method of claim 9, wherein the carrier frequency is in the range of 750 MHz to 850 MHz.

13. The method of claim 9, wherein the carrier frequency is in the range of 1.8 GHz to 1.9 GHz.

14. The method of claim 9, wherein the generating step is performed using an electro-magnetic conversion method.

* * * * *